US00RE45474E

(19) United States
(12) Reissued Patent
Andre et al.

(10) Patent Number: US RE45,474 E
(45) Date of Reissued Patent: Apr. 21, 2015

(54) ELECTRONIC DEVICE

(75) Inventors: Bartley K. Andre, Palo Alto, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steven P. Jobs, Palo Alto, CA (US); BJ Watrous, legal representative, Cupertino, CA (US); Duncan Robert Kerr, San Francisco, CA (US); Shin Nishibori, Kailua, HI (US); Matthew Dean Rohrbach, San Francisco, CA (US); Douglas B. Satzger, San Francisco, CA (US); Calvin Q. Seid, Palo Alto, CA (US); Vincent Keane Seid, legal representative, Los Gatos, CA (US); Christopher J. Stringer, Woodside, CA (US); Eugene Antony Whang, San Francisco, CA (US)

(73) Assignee: Apple Inc., Cupertino, CA (US)

(21) Appl. No.: 29/366,477

(22) Filed: Jul. 26, 2010

Related U.S. Patent Documents

Reissue of:
(64) Patent No.: Des. 532,011
Issued: Nov. 14, 2006
Appl. No.: 29/208,332
Filed: Jun. 24, 2004

U.S. Applications:
(62) Division of application No. 29/327,929, filed on Nov. 14, 2008, which is an application for the reissue of Pat. No. Des. 532,011.

(51) LOC (10) Cl. ..... 14-02
(52) U.S. Cl.
USPC ..... D14/375
(58) Field of Classification Search
USPC ..... D14/371–376, 125, 129, 356, 336, 334, D14/335, 337, 439, 447, 448, 450, 451, 452, D14/126, 457, 251, 253; 248/917–924, 371, 248/157, 176.1, 278.1; 341/12; 345/104, 345/156, 173, 174, 901–905; 348/180, 184, 348/325, 739; 349/1, 2, 11, 62; D19/90, 91; D6/310
See application file for complete search history.

(56) References Cited

U.S. PATENT DOCUMENTS

| | | | | | |
|---|---|---|---|---|---|
| D108,457 | S | * | 2/1938 | Rhode | D6/310 |
| D137,047 | S | * | 1/1944 | Halpern | D6/310 |
| D141,410 | S | * | 5/1945 | Meyers | D27/184 |
| 4,073,460 | A | * | 2/1978 | Dale | 248/441.1 |
| D251,426 | S | * | 3/1979 | Molyneux | D14/229 |
| D289,873 | S | | 5/1987 | Gemmell et al. | |
| D294,262 | S | * | 2/1988 | Thies et al. | D14/375 |
| D314,013 | S | * | 1/1991 | Rowe | D19/76 |
| D320,121 | S | * | 9/1991 | Krapf | D6/420 |
| D356,555 | S | * | 3/1995 | Takemasa et al. | D14/374 |
| D408,383 | S | * | 4/1999 | Carter et al. | D14/374 |
| D413,110 | S | * | 8/1999 | Sweere et al. | D14/447 |
| D421,274 | S | * | 2/2000 | Kreimer et al. | D19/90 |
| D428,415 | S | * | 7/2000 | Shibata | D14/356 |
| D432,101 | S | * | 10/2000 | Oba | D14/126 |
| D433,021 | S | * | 10/2000 | Shibata | D14/356 |
| D434,763 | S | | 12/2000 | Jobs et al. | D14/375 |
| D448,030 | S | * | 9/2001 | Park | D14/374 |
| D448,031 | S | * | 9/2001 | Goetz | D14/374 |
| D453,022 | S | * | 1/2002 | Oba | D14/374 |
| D455,755 | S | * | 4/2002 | Levine et al. | D14/447 |
| D456,023 | S | | 4/2002 | Andre et al. | D14/375 |
| D464,049 | S | * | 10/2002 | Goto | D14/374 |
| D476,335 | S | * | 6/2003 | Miao et al. | D14/375 |
| D486,486 | S | | 2/2004 | Jobs et al. | |
| D487,893 | S | | 3/2004 | Jobs et al. | |
| D488,139 | S | * | 4/2004 | Takami et al. | D14/126 |
| D489,370 | S | | 5/2004 | Jobs et al. | |
| D491,901 | S | * | 6/2004 | Chin et al. | D14/126 |
| D494,971 | S | | 8/2004 | Jobs et al. | |
| D495,332 | S | | 8/2004 | Jobs et al. | |
| D496,040 | S | | 9/2004 | Jobs et al. | |
| D504,889 | S | | 5/2005 | Andre et al. | |
| D531,179 | S | * | 10/2006 | Yamashiro et al. | D14/375 |
| 2003/0189155 | A1 | * | 10/2003 | Serbinski et al. | 248/371 |

OTHER PUBLICATIONS

U.S. Appl. No. 29/208,301, filed Jun. 24, 2004.

* cited by examiner

*Primary Examiner* — Deanna L Pratt
(74) *Attorney, Agent, or Firm* — Saidman DesignLaw Group, LLC

(57) CLAIM

We claim the ornamental design for a electronic device, substantially as shown and described.

DESCRIPTION

*Notice: More than one reissue application has been filed for the reissue of U.S. Pat. No. D532,011. The reissue applications are application Ser. No. 29/366,477 (the present application), Ser. No. 29/327,929, filed Nov. 14, 2008, Ser. No. 29/366,469, filed Jul. 26, 2010, Ser. No. 29/366,475, filed Jul. 26, 2010, Ser. No. 29/366,476, filed Jul. 26, 2010, Ser. No. 29/366,480, filed Jul. 26, 2010, and Ser. No. 29/366,481, filed Jul. 26, 2010, all of which are divisional reissues of U.S. Pat. No. D532,011.*

[FIG. 1 is a front perspective view of an electronic device in accordance with the present design. The electronic device may correspond to a display device or computer that incorporates a processor and a display device into a single housing;]

[FIG. 2 is a rear perspective view thereof;]

[FIG. 3 is a from view thereof;]

[FIG. 4 is a rear view thereof;]

[FIG. 5 is a top view thereof;]

[FIG. 6 is a bottom view thereof;]

[FIG. 7 is a right side view thereof; and,]

[FIG. 8 is a left side view thereof.]

*FIG. 9 is a front perspective view of an electronic device showing our new design;*

*FIG. 10 is a rear perspective view thereof;*

*FIG. 11 is front view thereof;*

*FIG. 12 is a rear view thereof;*

*FIG. 13 is a top view thereof;*

*FIG. 14 is a bottom view thereof;*

*FIG. 15 is a right side view thereof; and,*

*FIG. 16 is a left side view thereof.*

The broken lines are shown in the views for illustrative purposes only and form no part of the claimed design.

*The dotted broken lines illustrate environmental structure and form no part of the claimed design.*

*The dot-dot-dash broken lines represent an unclaimed boundary and form no part of the claimed design.*

1 Claim, 3 Drawing Sheets

Matter enclosed in heavy brackets [ ] appears in the original patent but forms no part of this reissue; matter printed in italics indicates the additions made by reissue.

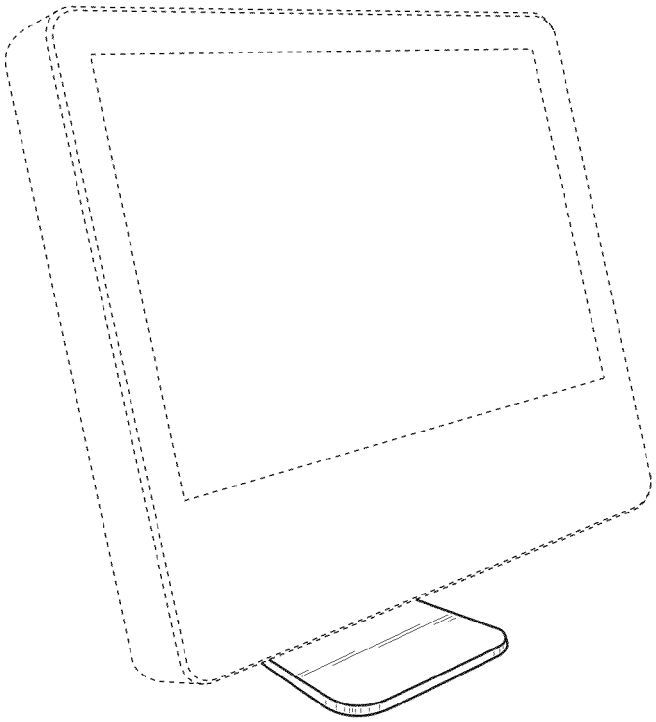
*Fig. 9 (new)*
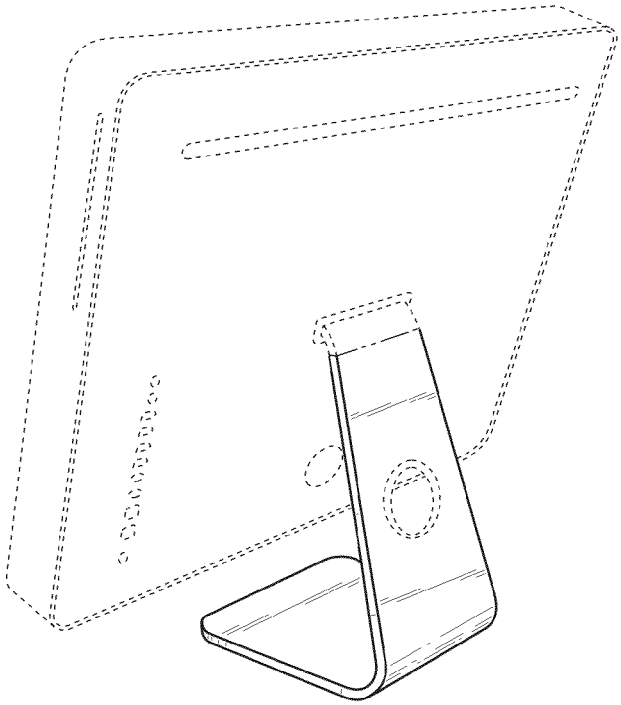
*Fig. 10 (new)*

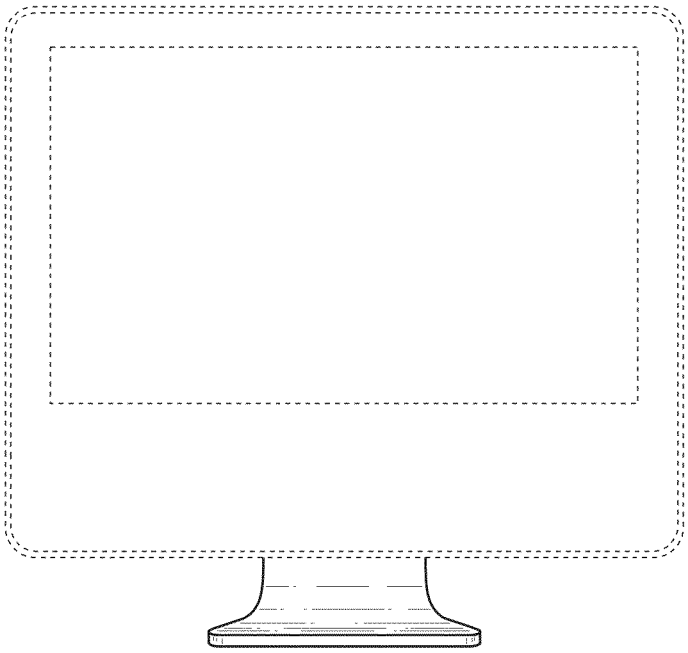
Fig. 11 (new)
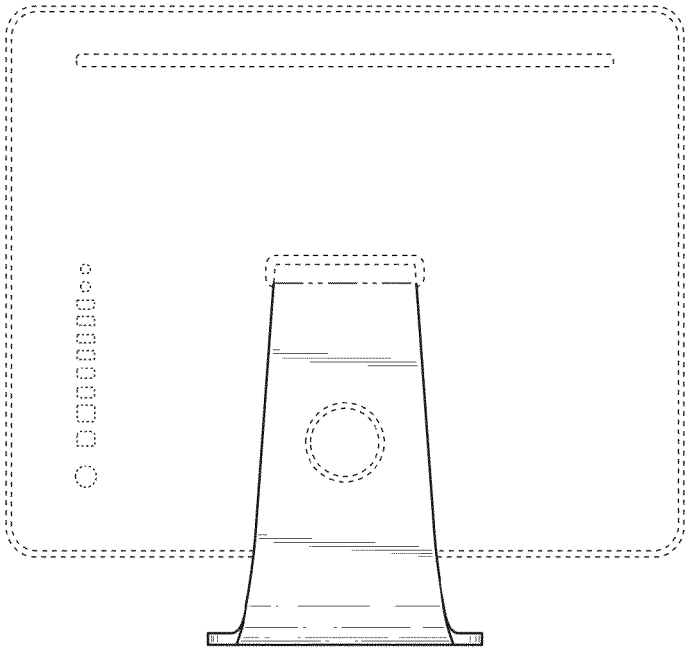
Fig. 12 (new)

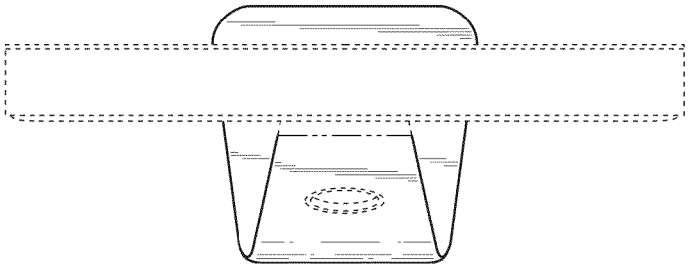
Fig. 13 (new)
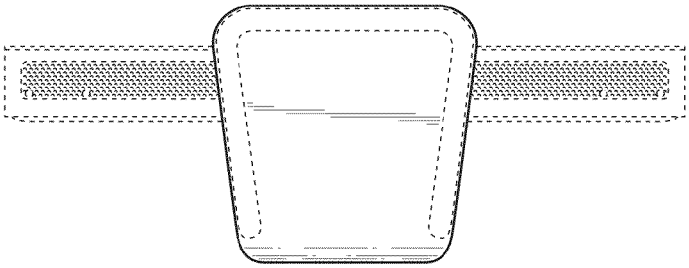
Fig. 14 (new)
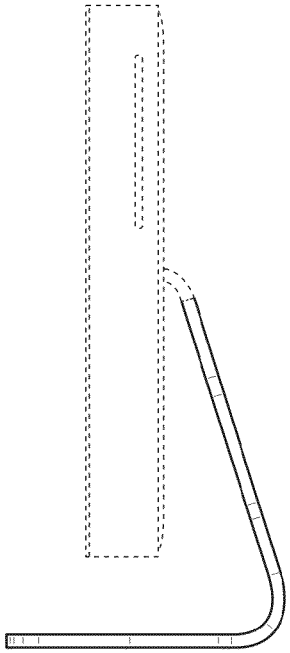
Fig. 15 (new)
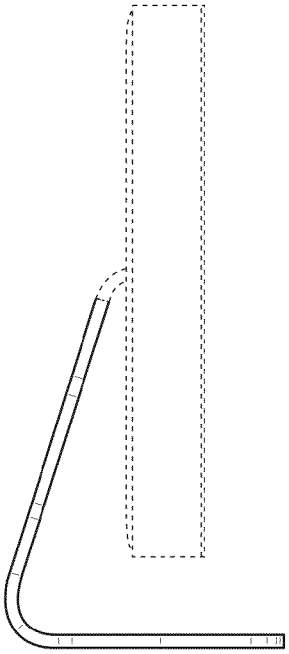
Fig. 16 (new)